US007559725B2

(12) United States Patent
Mathis, Jr. et al.

(10) Patent No.: US 7,559,725 B2
(45) Date of Patent: Jul. 14, 2009

(54) CONVEYOR FOR AND METHOD OF CONVEYING HEATED MATERIAL

(75) Inventors: Oscar L. Mathis, Jr., Cary, IL (US); Richard P. Kempf, Woodstock, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 495 days.

(21) Appl. No.: 11/273,232

(22) Filed: Nov. 14, 2005

(65) Prior Publication Data

US 2007/0108023 A1 May 17, 2007

(51) Int. Cl.
*B65G 53/60* (2006.01)

(52) U.S. Cl. .................................... 406/168; 198/752.1

(58) Field of Classification Search ................... 406/98, 406/134, 168; 198/752.1; 221/183
See application file for complete search history.

(56) References Cited

U.S. PATENT DOCUMENTS

| | | | | |
|---|---|---|---|---|
| 3,770,097 | A | 11/1973 | Musschoot | |
| 3,885,606 | A * | 5/1975 | Krauss | 141/71 |
| 3,989,227 | A | 11/1976 | Musschoot | |
| 4,306,359 | A * | 12/1981 | Hoyt | 34/577 |
| 4,389,978 | A | 6/1983 | Northcote | |
| 4,415,444 | A | 11/1983 | Guptail | |
| 4,503,783 | A | 3/1985 | Musschoot | |
| 4,646,759 | A * | 3/1987 | Thatcher et al. | 131/110 |
| 4,708,534 | A * | 11/1987 | Gallant | 406/75 |
| 4,715,763 | A | 12/1987 | Galgana et al. | |
| 4,724,779 | A | 2/1988 | White et al. | |
| 4,901,652 | A | 2/1990 | Pressnall et al. | |
| 5,018,909 | A * | 5/1991 | Crum et al. | 406/138 |
| 5,713,345 | A | 2/1998 | Bentsen et al. | |
| 5,775,237 | A | 7/1998 | Reilly et al. | |
| 6,241,951 | B1 | 6/2001 | Musschoot et al. | |
| 6,745,705 | B1 | 6/2004 | Benesch et al. | |
| 2005/0115477 | A1 | 6/2005 | Magaldi | |

FOREIGN PATENT DOCUMENTS

| | | |
|---|---|---|
| CA | 2546587 | 6/2005 |
| DE | 311 639 | 3/1914 |
| DE | 447 081 | 7/1927 |
| DE | 341 65 26 | 1/1985 |
| DE | 195 28 765 | 2/1997 |
| EP | 0 931 981 | 7/1999 |
| WO | WO 82/00188 | 1/1982 |
| WO | WO 97/00406 | 1/1997 |
| WO | WO 2005/052482 | 6/2005 |

OTHER PUBLICATIONS

Extended Search Report of European Counterpart Application (7 pages).

* cited by examiner

*Primary Examiner*—Douglas A Hess
(74) *Attorney, Agent, or Firm*—Marshall, Gerstein & Borun LLP

(57) ABSTRACT

A conveyor may include a conveyor includes a frame, a trough supported on the frame, and a vibratory generator operatively coupled to the trough. The trough has a trough wall with a first plurality of apertures, and a plurality of baffles are spaced above the first plurality of apertures in the trough wall, the baffles defining a second plurality of apertures through which air exiting the first plurality of apertures may pass.

14 Claims, 7 Drawing Sheets

CONVEYOR FOR AND METHOD OF CONVEYING HEATED MATERIAL

BACKGROUND

This patent is directed to a conveyor for and a method of conveying heated material, and, in particular, to a vibratory conveyor for and method of conveying heated material, such as hot ash, for example.

SUMMARY OF THE INVENTION

In one aspect, a conveyor includes a frame, a trough supported on the frame, and a vibratory generator operatively coupled to the trough. The trough has a trough wall with a first plurality of apertures in the trough wall, and a plurality of baffles are spaced above the first plurality of apertures in the trough wall, the baffles defining a second plurality of apertures through which air exiting the first plurality of apertures may pass.

In another aspect, a conveyor system includes a frame, a trough assembly supported on the frame, and a vibratory generator operatively coupled to the trough. The trough assembly includes a plurality of trough assembly segments, each trough assembly segment including a trough segment having a trough wall and a plenum disposed beneath the trough wall. The trough wall of each trough segment has a first plurality of apertures through which air exiting the plenum may pass, and a plurality of baffles are spaced above the apertures in the trough wall of each trough segment, the baffles attached to the trough wall and defining a second plurality of apertures through which air exiting the first plurality of apertures may pass.

In an additional aspect, a method of conveying a heated material includes receiving heated material in a trough and vibrating the trough to direct material along the trough. The method also includes directing air through passages in the trough in a first direction, and diverting air that has passed through the passages in a second direction along a surface of the trough.

Additional aspects of the disclosure are defined by the claims of this patent.

DETAILED DESCRIPTION OF VARIOUS EMBODIMENTS

Although the following text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
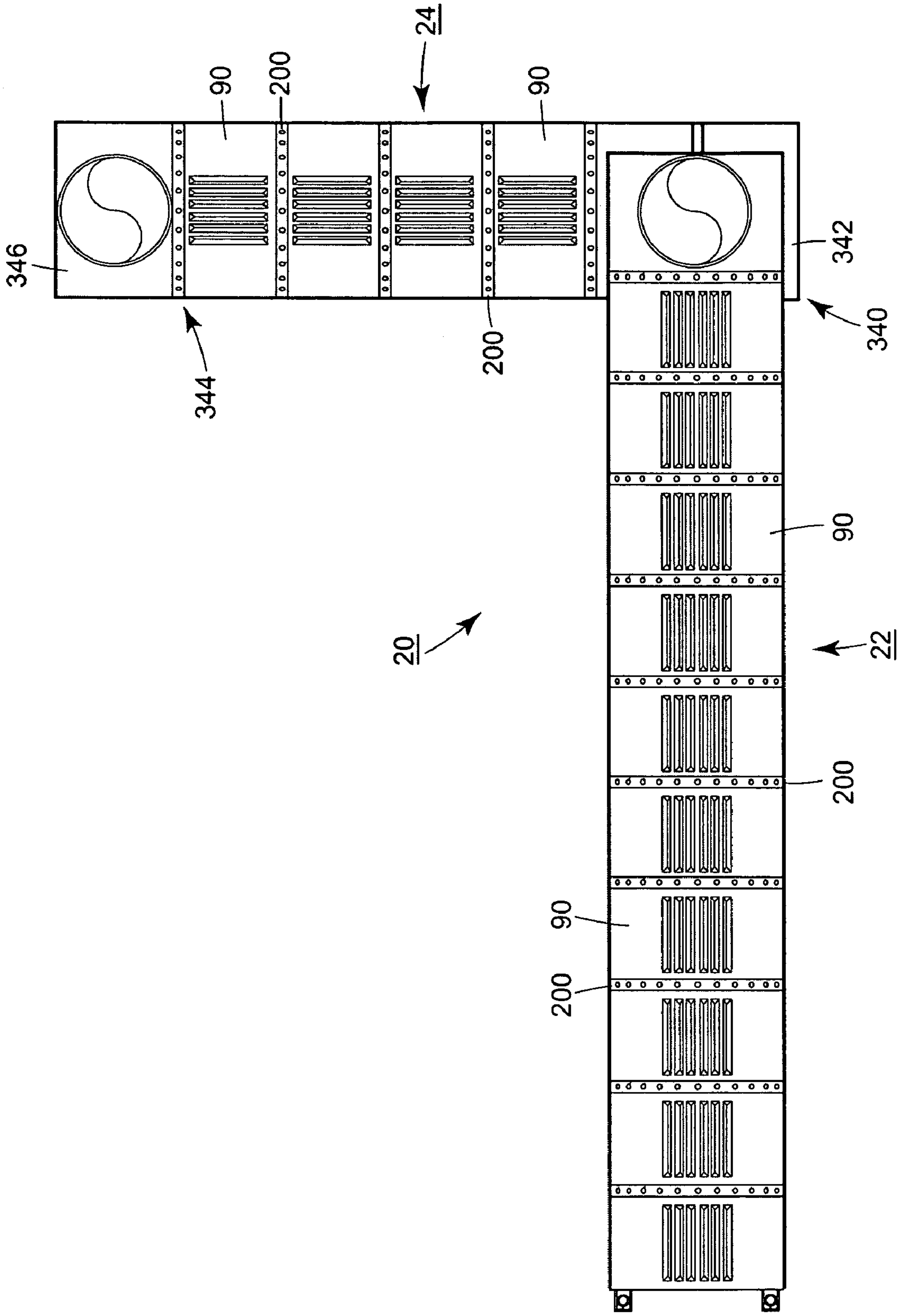
FIG. 1 is a plan view of an embodiment of a system including a conveyor according to the present disclosure.
Figure 2:
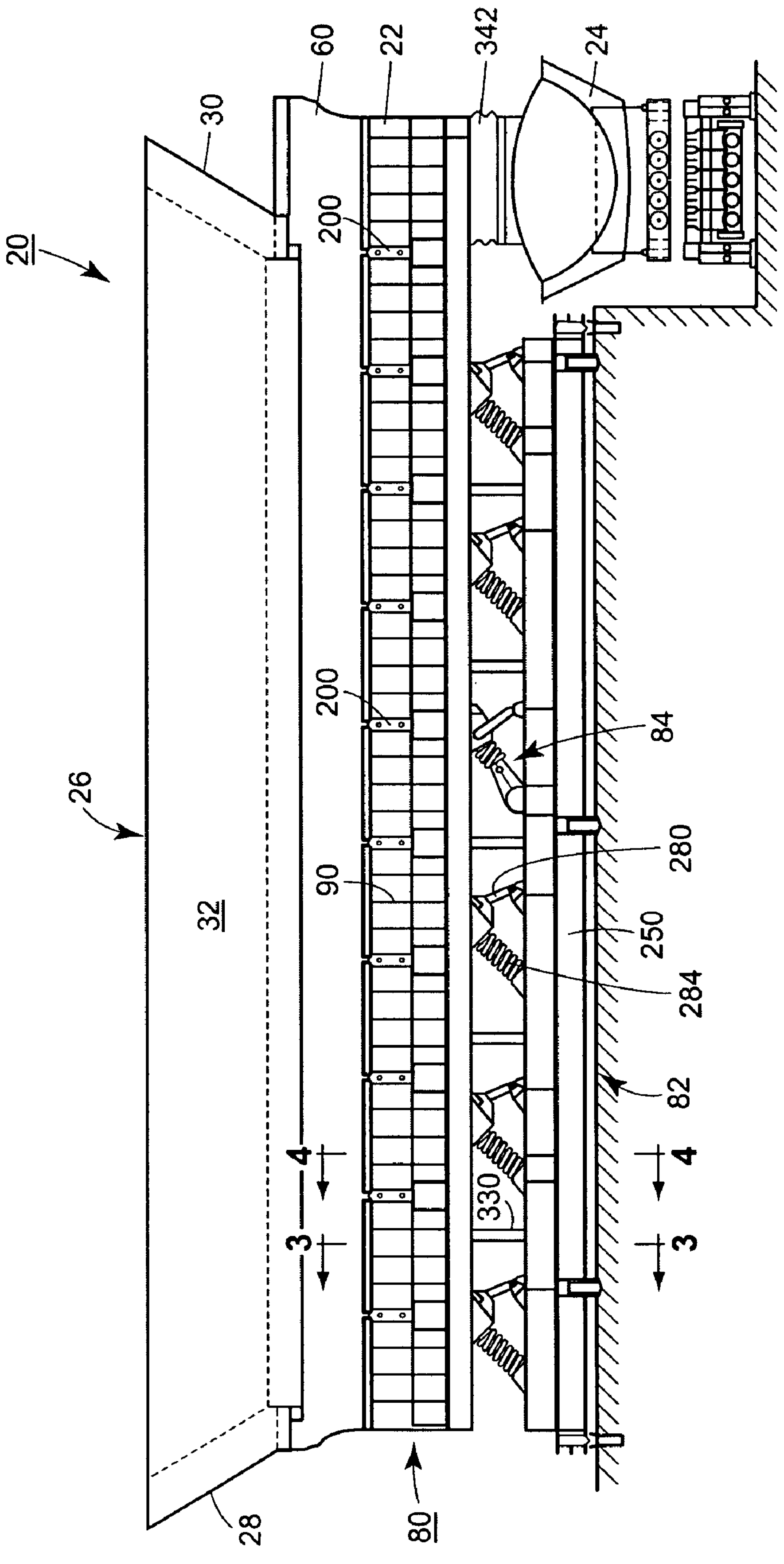
FIG. 2 is a side view of the system illustrated in FIG. 1 with an associated air supply system removed.

FIGS. 1 and 2 illustrate an embodiment of a conveyor system 20 for conveying heated materials, such as hot ash. The conveyor system 20 may include two conveyors 22, 24, although a conveyor system 20 according to the present disclosure may include only one such conveyor. The conveyor 22 may be referred to as a receiving conveyor, and the conveyor 24 may be referred to as a transfer conveyor. While the conveyors 22, 24 may be very similar structurally and may operate similarly, this need not be the case in all such systems 20; for example, the transfer conveyor 24 may be a different type of conveyor altogether. Likewise, there is no intended limitation as to how conveyors 22, 24 may be arranged in a system 20 by virtue of the illustration of FIGS. 1 and 2.

As illustrated, the system 20 may be used in conjunction with a transition hopper 26 to facilitate the movement of heated material into the conveyor 22. The inner surface of the hopper 26 may be lined with refractory bricks to improve resistance to high temperatures.

Figure 3:
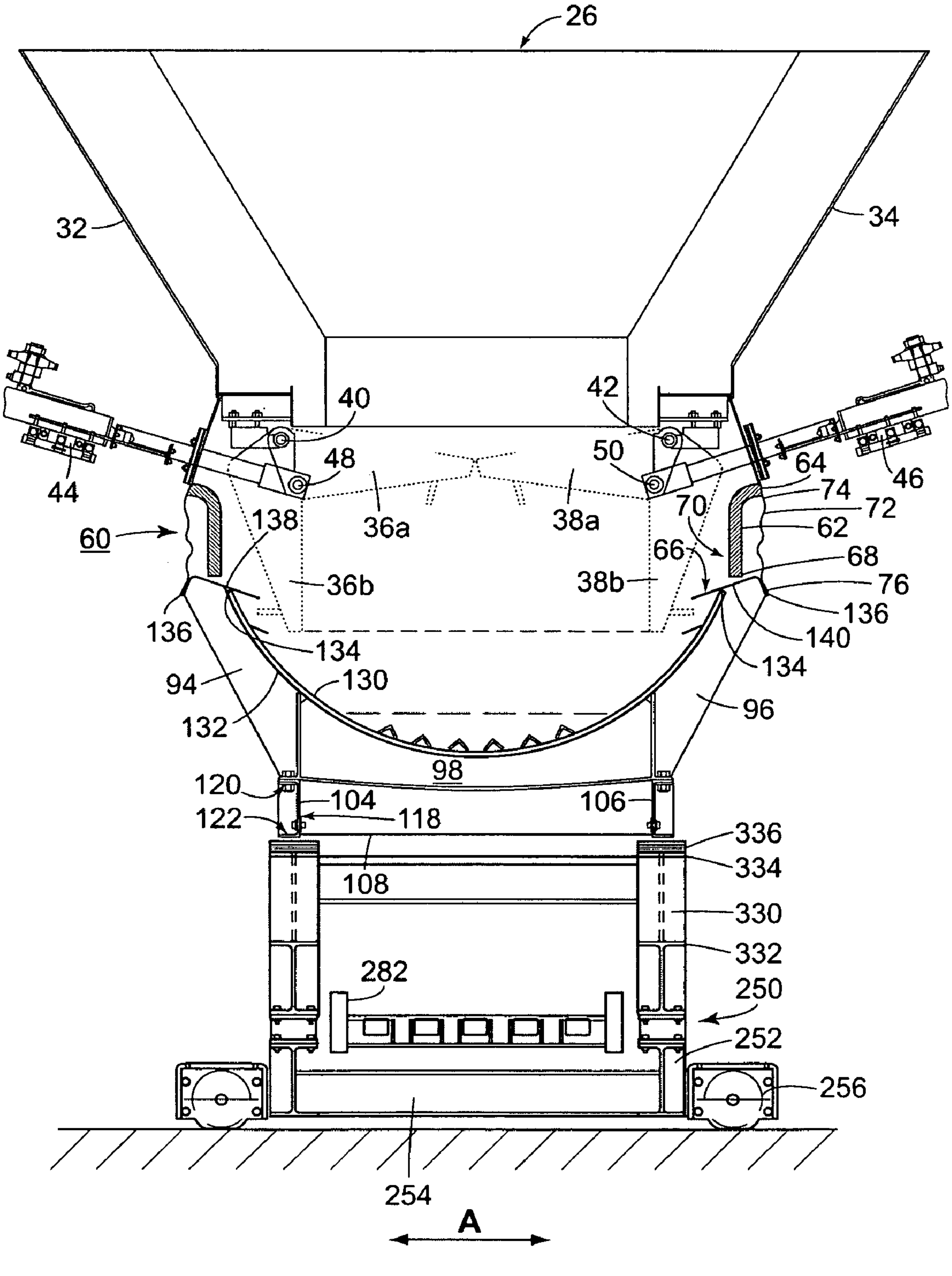
FIG. 3 is an enlarged, cross-sectional view of the conveyor illustrated in FIG. I taken along line 3-3.

The transition hopper 26 may have sloped ends 28, 30 (FIG. 2) and sloped sides 32, 34 (FIG. 3) which may assist in directing the heated ash into the conveyor 22. Moreover, as shown in FIG. 3, the hopper 26 may include doors 36, 38, which may be pivotally mounted to the hopper 26 at pivots 40, 42 so as to be moveable between a first, closed position or state 36_a_, 38_a_ and a second, open position or state 36_b_, 38_b_. Additionally, actuators 44, 46 (e.g., hydraulic actuators) may be pivotally attached at pivots 48, 50 to the doors 36, 38, and may be operatively coupled to a controller (not shown) so as to selectively move the doors 36, 38 between the closed 36_a_, 38_a_ and open 36_b_, 38_b_ positions according to signals received from the controller.

As illustrated, the hopper 26 is supported independently from the conveyor 22. However, a seal assembly 60 (FIG. 3) bridges the space between the conveyor 22 and the hopper 26.

The seal assembly 60 includes a guard 62 that is attached at an upper end 64 to the hopper 26, and that depends downward towards an upper edge 66 of the conveyor 22, leaving a space 68 between a lower edge 70 of the guard 62 and the upper edge 66 of the conveyor 22. The seal assembly 60 also includes a flexible, high-temperature seal 72 that is attached at its upper edge 74 to the hopper 26 and at its lower edge 76 to the upper edge 66 of the conveyor 22. The guard 62 limits material exiting the hopper 26 from impacting the seal 72. Overall, the expansion seal assembly 60 limits material from exiting the system 20, while isolating the conveyor 22 from movements of the hopper 26.

Turning to FIG. 2, the conveyor 22 includes a trough assembly 80 which is supported on a wheeled frame 82. Material moves along the trough assembly 80 under the influence of vibrations induced in the trough assembly 80 by a vibratory generator 84, which as illustrated is a two-mass vibratory generator 84, although other vibratory generators may also be used with the conveyor 22 as described herein. Each component (trough assembly 80, frame 82, and vibratory generator 84) is now discussed separately.

Figure 4:
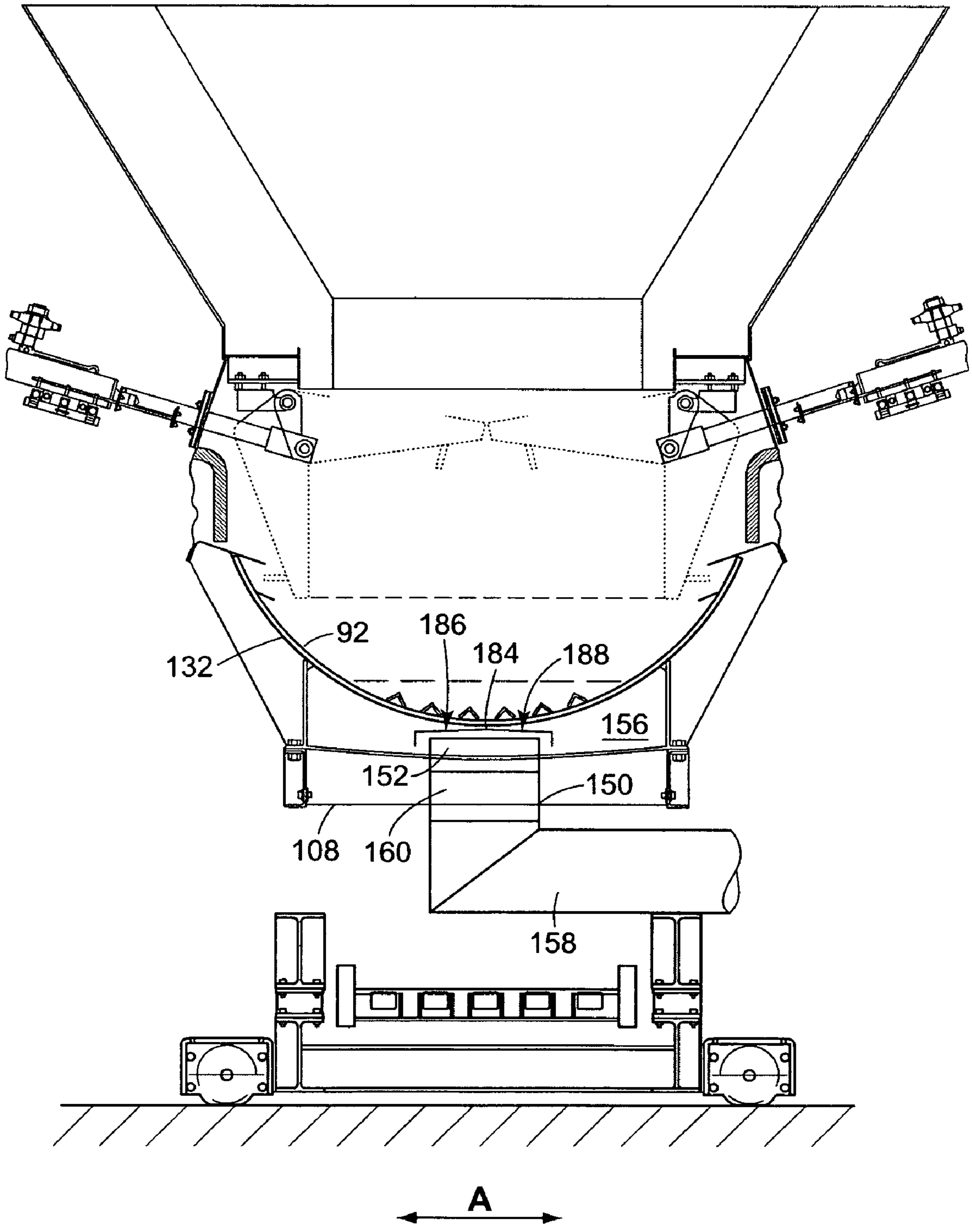
FIG. 4 is an enlarged, cross-sectional view of the conveyor illustrated in FIG. 1 taken along line 4-4.

Turning first to the trough assembly 80, with reference to FIGS. 1 and 2, it will be recognized that the assembly 80 includes a plurality of segments 90, each segment 90 being similar to the other segments 90 as illustrated, although this need not be the case in every embodiment of the conveyor 22. As illustrated in FIGS. 3 and 4, each segment 90 includes a trough segment 92 (which may be defined by a semi-circular, abrasion-resistant steel plate, for example, and collective referred to as a trough), outer support webs 94, 96, inner support web 98, structural members 104, 106, and bottom wall 108. One advantage of the use of the segmented or modular assembly may be the facilitation of relative thermal expansion along the trough. Another advantage of the use of a segmented or modular assembly, as opposed a unitary assembly, may be improved ease of maintenance through the replacement of worn segments, for example, rather than replacement of a larger, unitary whole with worn sections. As illustrated in FIGS. 1 and 2, the receiving conveyor 22 includes ten segments 90, while the transfer conveyor includes four segments 90.

As shown in FIGS. 3 and 4, the trough segment 92 may then be disposed such that a lower surface 132 of the segment 92 abuts an upper edge 130 of the outer and inner support webs 94, 96, 98, and may be fastened to the webs 94, 96, 98 by welding, for example. The upper edges 134 of the trough segment 92 and upper edges 136 of the outer support webs 94, 96 may be spanned by rim plates 138, 140, which plates 138, 140 may be attached to the upper edges 136 of the outer support webs 94, 96 and the upper edges 134 of the trough segment 92, by welding, for example. It will be recognized that such an arrangement may accommodate the thermal expansion and contraction of the trough segment 92 relative to the remainder of the structure of the trough assembly segment 90 as the conveyor 22 receives heated material and cools and transports the heated material along its length.

As shown in FIG. 4, the bottom wall 108 may have an opening 150 formed therein, into which is disposed a first segment 152 of a conduit 154 through which air may pass as it is blown into a plenum 156 (which may run the entire length of the trough, for example) defined between the lower surface 132 of the trough segment 92 and the bottom wall 108. A second segment 158 of the conduit 154 may be disposed outside of the plenum 156 and may extend beyond the conveyor 22. As will be explained in greater detail with reference to FIG. 8, the segment 158 of the conduit 154 may be in communication with a blower which may cause air to be directed through the conduit 154 and into the plenum 156, and from the plenum 156 onto and into the heated material transported in the conveyor 22 to cool the material as it is transported along the conveyor 22. The first and second segments 152, 158 of the conduit 154 may be joined by a flexible connector 160, which may permit relative motion between the segments 152, 158, although the segments 152, 158 may themselves be flexible as well, which may make the connector 160 optional.

Figure 5:
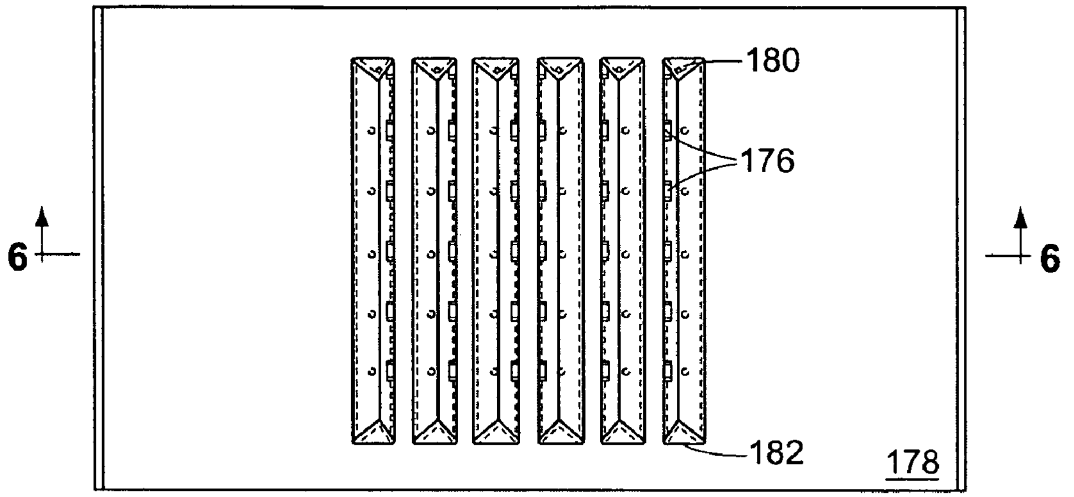
FIG. 5 is an enlarged, plan view of a trough segment of the conveyor of FIG. 1.
Figure 6:
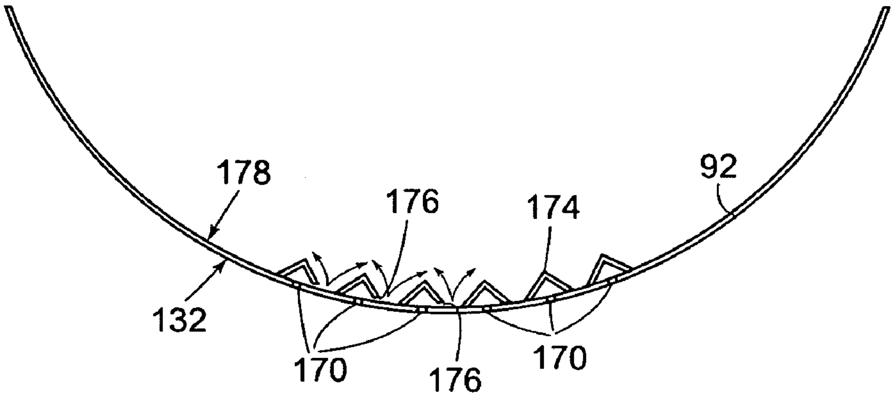
FIG. 6 is an enlarged, cross-sectional view of the trough segment illustrated in FIG. 5 taken along line 6-6.

As also shown in FIG. 4, but as more easily seen in FIG. 6, the wall of the trough segment 92 may have a plurality of apertures or passages 170 formed therethrough, to permit the air in the plenum 156 to exit the plenum 156. The apertures 170 may be arranged in sets, the sets of apertures being parallel to a longitudinal axis of the trough. The air passing through the apertures 170 is directed against a surface 172 of one of a plurality of baffles 174, which direct the air exiting the plenum 156 through the apertures 170 through a second plurality of apertures or passages 176 and thus along a section of an upper surface 178 of the segment 92. The direction of the air may thus change from the direction it takes as it passes through the apertures 170 to a direction roughly at right angles to the first direction as the air passes through the apertures 176. This arrangement of apertures 176 may also facilitate self-cleaning of particulate that may enter the baffles 174. As illustrated, the baffles 174 may be defined by a plate having two walls disposed in an L-shaped cross-section and triangular end caps 180, 182 (see FIG. 5), and attached to the trough segment wall, as illustrated.

It will be recognized, however, that while the baffles 174 are defined by an L-shaped plate as illustrated, other shapes are possible for the baffles 174. Moreover, while the apertures 176 are disposed on a single side of the baffles 174, the apertures 176 may be disposed on both sides of the baffles 174, if desired. Furthermore, while the apertures 176 direct the air flow along a section of the upper surface 178 of the trough segment 92, the air flow may be directed in another pattern entirely. The embodiment illustrated is thus one exemplary embodiment.

Returning then to FIG. 4, it will be recognized that the first segment 152 of the conduit 154 is open. It will further be recognized that to the extent that air may pass from the plenum 156 through the apertures 170, 176 into the space bounded by the trough segment 92, so too may particulate matter pass from the space bounded by the trough segment 92 through the apertures 170, 176 into the plenum 156. To limit the potential of such particulate matter (e.g., hot ash) from entering the open first segment 152, a tented cover 184 is placed between the open first segment 152 and the trough segment 90. The sloping surfaces 186, 188 of the cover 184 help to direct such particulate matter away from the open segment 152.

Figure 7:
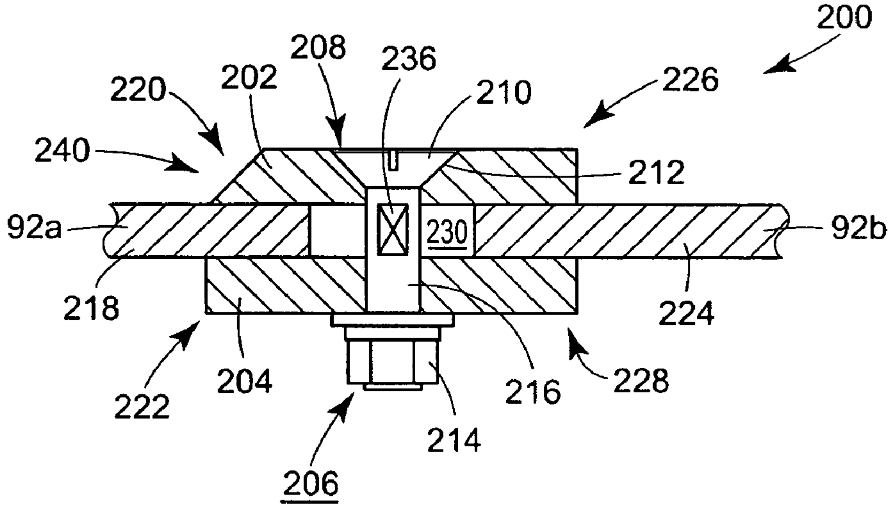
FIG. 7 is a fragmentary, enlarged, cross-sectional view of a joint between adjacent trough segments of the conveyor of FIG. 1.

To join the trough segments 92 together, a series of butt joints 200 may be formed, as illustrated in FIGS. 1 and 2 and in enlarged cross-section in FIG. 7. As illustrated in FIGS. 1 and 2, the receiving conveyor 22 includes ten butt joints 200, while the transfer conveyor 24 includes five butt joints 200.

Each butt joint 200 may include an inner band 202 and an outer band 204. The inner band 202 may be connected to the outer band 204 by a fastener set 206, as illustrated. In particular, the fastener set 206 includes a bolt 208, which has a head 210 that is received in a countersunk aperture 212 formed in the inner band 202, and a nut 214, which may be threadably connected to the shaft 216 of the bolt 208. An edge 218 of an upstream trough segment 92*a* may be disposed between the first ends 220, 222 of the inner and outer bands 202, 204, and an edge 224 of a downstream trough segment 92*b* may be disposed between the second ends 226, 228 of the inner and outer bands 202, 204. The fastener set 206 may then be tightened to grip the edges 218, 224 between the inner and outer bands 202, 204. The space 230 between the edges 218, 224 may allow relative motion between adjacent trough segments 92*a*, 92*b* caused by differences in thermal expansion.

Disposed within the space 230 may be spacer 236, such as may be formed of key stock. This spacer 236 may have a width that is slightly less than that of segments 92*a*, 92*b*. By placing the spacer 236 in the space 230, it is believed that the deflection and/or dishing of the inner and outer bands 202, 204 into the space 230 may be limited. By limiting the deflection and/or dishing of the inner and outer bands 202, 204, the relative thermal expansion of the segments 92*a*, 94*b* along the longitudinal axis of the trough may be facilitated.

Also of note relative to the butt joint 200, as illustrated, is the angled edge 240 of the inner band 202 at the first end 220. It is believed that the angled edge 240 of the inner band 202 may permit material flowing along the length of the conveyor to make a smoother transition from an upstream trough segment 92*a* to a downstream trough segment 92*b*. Alternatively, the butt joint 200 may be formed without the angled edge 240.

As mentioned previously, the trough assembly 80 is supported on a wheeled frame 82. As seen in FIGS. 2, 3, and 4, the wheeled frame 82 includes a base 250 which includes one or more longitudinal segments 252 that are connected by transverse segments 254. The longitudinal and transverse segments 252, 254 may be joined by welding, for example. Attached (e.g., bolted) to the base 250 at various lengths are wheel assemblies 256. The wheel assemblies 256 are pivotally mounted to the base 250 in such a way as to permit movement in the direction of the arrow "A" as shown in FIGS. 3 and 4. In operation, the wheel assemblies 256 may be disposed in such that they do not contact the floor, the wheel assemblies 256 being dropped down onto rails (not shown) embedded in the floor to enable movement of the conveyor from beneath the hopper 26. However, to limit the movement of the wheeled frame 82 and associated trough assembly 80, anchor bolts and nuts located along the base 250 may be used.

Figure 8:
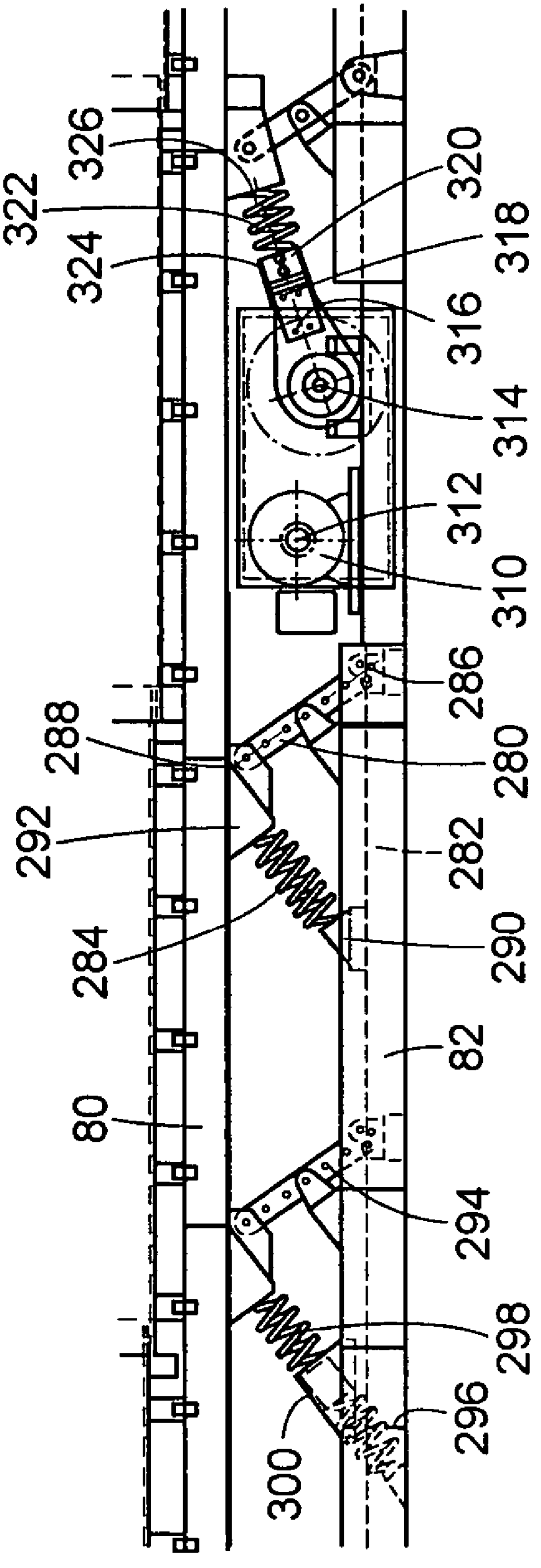
FIG. 8 is a fragmentary, enlarged, side view showing an associated vibratory generator and connections between the trough assembly, counterbalance and frame of the upper conveyor shown in FIG. 1.

As seen in FIG. 2 and to a greater degree in FIG. 8, the trough assembly 80 may be coupled to the frame 82 by a plurality of rigid links 280 and to a counterbalance 282 by a plurality of resilient members 284. The rigid links 280 may each be pivotally attached at a first end 286 to the frame 82 and at a second end 288 to the trough assembly 80, and the angle formed between each rigid link 280 and the bottom of the trough assembly 80 may be an obtuse angle. The resilient members 284, which may be springs and may be referred to as reaction springs, may each be fixedly attached at a first end 290 to the counterbalance 282 and at a second end 292 to the trough assembly 80, and the angle formed between each resilient member 284 and the bottom may be an acute angle. As illustrated, the plurality of links 280 and the plurality of resilient members 284 may be disposed in pairs, with the ends 288 of the links 280 and ends 292 of the resilient members 284 that make up each pair being attached to the trough assembly 80 adjacent to each other.

As also is visible in FIG. 8, the counterbalance 282 may be coupled to the frame 82 by a plurality of rigid links 294 and by a plurality of resilient members 296. Furthermore, the trough assembly 80 may be coupled to the frame 82 by a plurality of resilient members 298. In fact, the resilient members 296, 298, which may be springs, may be coupled to a tube 300 attached to the frame 82. The resilient members 296, 298 may be referred to as isolation springs, and may function to limit the transmission of vibrations to the floor.

Coupled between the trough assembly 80 and the counterbalance 282 is the vibratory generator 84, as seen in FIG. 2 and in greater detail in FIG. 8. The vibratory generator 84 may include a motor 310 with a shaft 312. The motor shaft 312 may be coupled to a driven shaft 314 by a drive belt (not shown). The driven shaft 314 may be an eccentric shaft. Attached to the eccentric shaft 314 via a flange cartridge bearing is a first end 316 of a link 318. A second end 320 of the link 318 is attached via a resilient member 322 to the trough assembly 80; that is, a first end 324 of the resilient member 322 is fixedly secured to the second end 320 of the link 318, while the second end 326 of the resilient member 322 is fixedly secured to the trough assembly 80. While one generator 84 has thus been discussed, other generators may be used according to the knowledge of one skilled in the art, and may be, for example, a brute force vibratory generator or a two-mass vibratory generator according to another arrangement.

Additionally, as illustrated in FIGS. 2 and 3, a series of columns 330 may be attached to the frame 82 along the length thereof. That is, each of the columns 330 has a lower end 332 that is fixedly attached, for example, by welding, to the frame 82, and an upper end 334 that depends in the direction of the trough assembly 80. Disposed on the upper end 334 of the column 330 is a shock absorber 336, which may be made of an elastomeric material. The ends of the structural members 104, 106 may cooperate with the shock absorbers 336 to limit the effect of material impacting the trough assembly 80, for example, from a great height.

Having thus described the conveyor 22, the conveyor 24 may be described as similar to the conveyor 22, except that the conveyor 24 is not mounted on wheels so as to be moveable. Instead, the frame of the conveyor 24 is attached to the floor. As seen in FIG. 1 and to a lesser degree in FIG. 2, material moves between a downstream end 340 of conveyor 22 to the conveyor 24 via a flexible chute 342, and similarly, material exits from the downstream end 344 of the conveyor 24 via a flexible chute 346.

Figure 9:
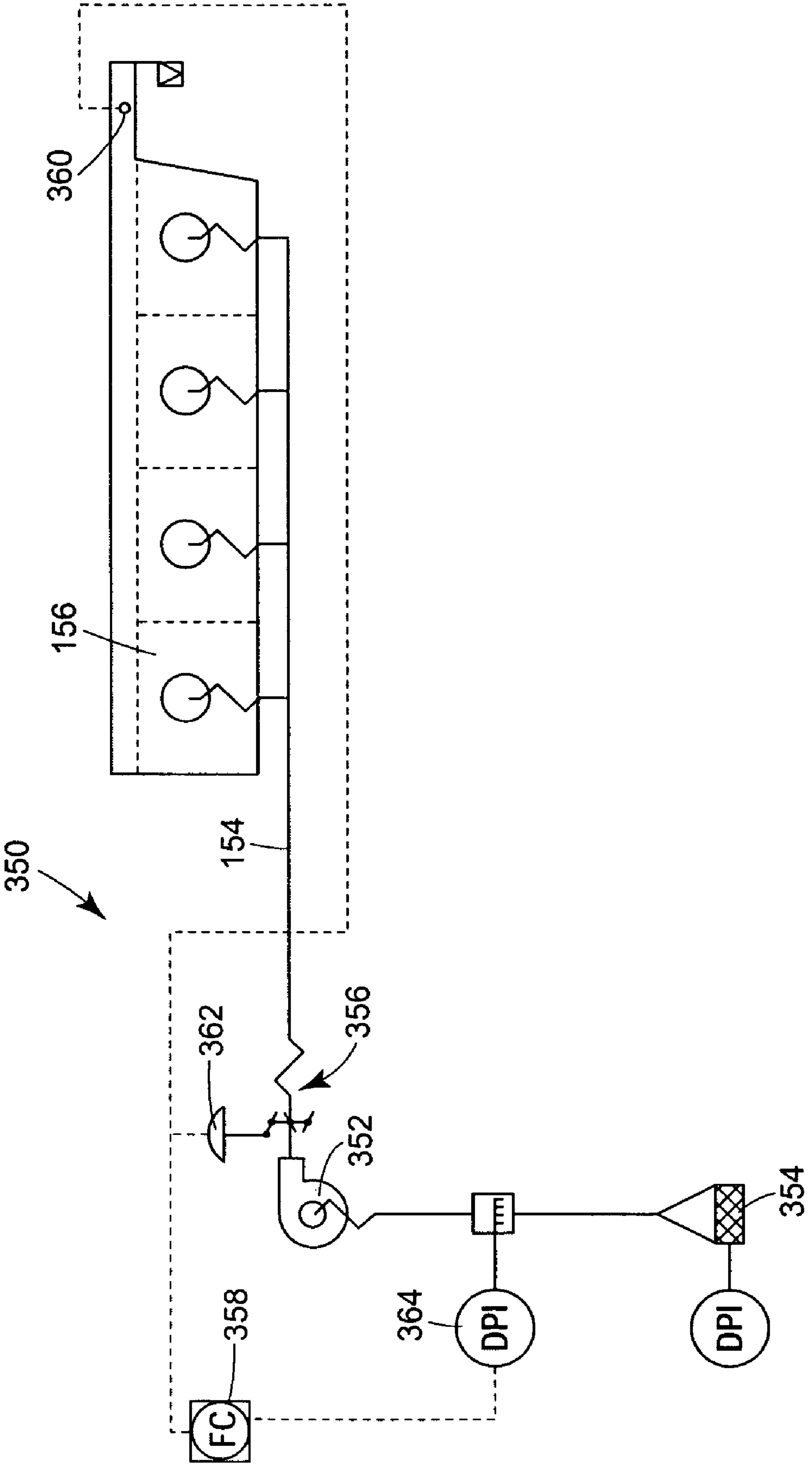
FIG. 9 is a schematic an air supply and control system for use with the system illustrated in FIG. 1.

Associated with the conveyor system 20 and illustrated in FIG. 9 is an air supply and control system 350, which may be referred to as part of the conveyor system 20 according to certain embodiments. One system 350 may be connected to both conveyors 22, 24, or a system 350 may be provided for each conveyor 22, 24 separately. As a further alternative, more than one system may be provided for a single conveyor 22, 24.

The air supply and control system 350 may include a fan or blower 352, an inlet filter 354, the afore-mentioned conduit 154 (which connects to the plenum 156 of various trough assembly segments 90), and an adjustable damper 356 disposed between the blower 352 and the conduit 154. The system 350 may also include a controller 358, which controller 358 may be operatively coupled to a temperature sensor 360 and an actuator 362 operatively coupled to the damper 356, as well as other sensors or equipment 364. In response to signals returned to the controller 358 from the sensor 360, the controller 358 may send a signal to the actuator 362 to move the damper 356 to vary the air flowing through the conduit 154 into the plenum 156. It will be recognized, that a plurality of sensors 360 and a plurality of dampers 356 (with associated actuators 362) may be included so as to provide a more focused and localized response to variations along the conveyor 22, 24.

It will be recognized that the system 350 discussed above is only one possible system 350 that may be used. Alternatives are possible. For example, the fan 352 may be equipped with a variable frequency drive (VFD) so as to permit the speed of the fan to be controlled. With such a VFD-equipped fan, the speed of the fan may be controlled to control the flow of the air in conjunction with or in substitution for control via the damper 356. Moreover, rather than a single controller 358 operating in a closed loop with a temperature sensor 360, a programmable logic controller (PLC) may be used to permit other control algorithms to be implemented.

Thus, according to one method of operation, heated material may be received in the hopper 26. When the doors 36, 38 are selectively move from their closed position 36*a*, 38*a* to their open position 36*b*, 38*b* (or some position therebetween), the heated material may be received in the conveyor 22, and in particular the trough. The material may be directed along the conveyor 22 in accordance with the vibrations provided by the vibratory generator 84. The frequency of the motor associated with the vibratory generator 84 may be used to control, for example, the speed of translation of the material along the conveyor 22.

As the material moves along the conveyor 22, and in particular along the trough segments 92, air may be blown onto, and, according to the consistency of the heated material, through, the heated material. In particular, in accordance with the signals provided by the temperature sensor 360, the controller 358 may vary the position of the damper 356 (through control of the associated actuator 362) to provide a certain flow of air into the plenum 156 associated with the various segments 90 of the conveyor 22. Air passing through the conduit 154 and entering the plenum 156 passes through the apertures 170, 176 so as to be directed onto the heated material moving along the conveyor 22. When the material reaches the downstream end 330 of the conveyor 22, the material passes through the chute 332.

The operation of the conveyor 24 is similar to that of the conveyor 22: as the material passes along the conveyor 24, air flowing from the plenum 156 of the segments 90 passes through the apertures 170, 176 and is directed onto the heated material. When the material reaches the downstream end 334 of the conveyor 24, it passes through the chute 336.

The above-described conveyor system 32 and method conveying heated material may be particularly advantageous for use in hot ash recovery, and in particular dry hot ash recovery.

Ash (also referred to as bottom ash) produced by coal-fired boilers can be beneficially used in a variety of construction and manufacturing applications, including as structural and engineering fill, cement raw material, aggregate for concrete and asphalt products and general reclamation purposes. A utility-sized, coal-fired boiler can produce large volumes of this ash. However, standard methods of ash recovery involve the use of water as a cooling fluid for the hot ash. The use of water for cooling purposes results creates operational and maintenance difficulties and inefficiencies, including the issues associated with drying the wet ash out once it is cooled so that it may be used in the afore-mentioned construction and manufacturing applications.

Use of the conveyor and conveying system according to the present disclosure may provide a way to avoid the difficulties and inefficiencies of the prior wet ash recovery methods. A coal-fired boiler plant may be equipped with one or more transition hoppers 26. These hoppers 26 may be sealed to the bottom of the boilers using a dry-type or water-impounded seal. The hoppers 26 may be independently supported from the boiler.

One or more conveyors 22 may be disposed beneath the hoppers 26 to receive the hot ash contained therein. The hot ash material moves forward by "throws and catches" from one point to the next because of the action of the vibratory generator 84, which motion also may minimize the sliding abrasion on the conveyor 22. It is believed that as air enters the trough through the apertures 170, 176, it passes over the trough surface and through the hot ash as the ash continues its motion along the hopper 26. It is further believed that this intimate, direct contact between the air and the ash as the air moves through the ash bed minimizes the amount of cooling air required for a specific ash temperature drop. It is also believed that the velocity of the air flow over the trough surface may be controlled so that it is not so fast as to fluidize the ash bed, thus permitting conveyance of the ash up an incline. It is also thought that one advantage of using air, rather than water, as the cooling fluid is that combustion of unburnt carbon pieces in the hot ash may continue, thus potentially improving overall heat recovery and boiler efficiency.

What is claimed is:

1. A conveyor system comprising:

a frame;

a trough assembly supported on the frame, the trough assembly comprising a plurality of trough assembly segments, each trough assembly segment including a trough segment having a trough wall and a plenum disposed beneath the trough wall, the trough assembly having a longitudinal axis along which material is transported, the trough assembly segments being arranged along the longitudinal axis and the trough walls having longitudinally opposing edges, the longitudinally opposing edges of adjacent trough segments being spaced apart to define a space therebetween, and including a plurality of butt joints, each butt joint gripping the longitudinally opposing edges of adjacent trough assembly segments;

a first plurality of apertures in the trough wall of each trough segment through which air exiting the plenum may pass;

a plurality of baffles spaced above the apertures in the trough wall of each trough segment, the baffles attached to the trough wall and defining a second plurality of apertures through which air exiting the first plurality of apertures may pass; and a vibratory generator operatively coupled to the trough assembly.

2. The conveyor system according to claim 1, wherein the plenum has a wall with an opening therethrough, comprising:

a conduit having a first open segment disposed through the opening and into the plenum; and a cover disposed between the trough segment and the first open segment of the conduit.

3. The conveyor system according to claim 1, comprising:

a conduit in communication with the plenum;

a blower in communication with the conduit;

an adjustable damper disposed between the blower and the conduit;

an actuator operatively coupled to the damper to move the damper; and a controller operatively coupled to the actuator to control the actuator to move the damper.

4. The conveyor system according to claim 3, comprising:

a temperature sensor disposed in the trough;

the controller coupled to the temperature sensor to receive a signal from the sensor and to control the actuator according to the signal received.

5. The conveyor system according to claim 1, comprising:

a hopper disposed above the trough assembly; and a seal assembly disposed between the hopper and the trough assembly, the seal assembly including a seal attached to the hopper and the trough assembly, and a guard disposed inside the seal and attached to the hopper and disposed above the trough assembly to define a space therebetween.

6. The conveyor system according to claim 5, wherein the seal comprises a flexible, high-temperature seal.

7. The conveyor system according to claim 1, comprising a shock absorber disposed between the trough and the frame, the shock absorber comprising an elastomeric material to reduce loading impact transmitted to the frame.

8. The conveyor system according to claim 1, wherein the trough wall comprises a semi-circular steel plate.

9. The conveyor system according to claim 1, wherein the butt joint comprises an inner band, an outer band, and a fastener set, the fastener set tightened to grip the edges of adjacent trough walls between the inner and outer bands.

10. The conveyor system according to claim 9, comprising a spacer disposed between the inner and outer bands of the butt joint.

11. The conveyor system according to claim 9, wherein an upstream edge of the inner band is angled.

12. The conveyor system according to claim 1, wherein the first plurality of apertures are arranged in sets parallel to the longitudinal axis of the trough assembly, and each of the baffles is attached to the trough wall over one of the sets of apertures.

13. The conveyor system according to claim 12, wherein each baffle comprises a plate having two sides disposed in an L-shaped cross-section and closed ends, the second plurality of apertures being formed through one of the sides of the plate.

14. The conveyor system according to claim 12, wherein air passes through the first plurality of apertures in a first direction and passes through the second plurality of apertures in a second direction at right angles to the first direction and along the trough wall.

* * * * *